(12) United States Patent
Franklin et al.

(10) Patent No.: US 11,175,503 B2
(45) Date of Patent: Nov. 16, 2021

(54) OPTICAL SYSTEM FOR HEAD-MOUNTED DISPLAY

(71) Applicant: Apple Inc., Cupertino, CA (US)

(72) Inventors: Jeremy C. Franklin, San Rafael, CA (US); Stephen E. Dey, San Francisco, CA (US); Phil M. Hobson, Menlo Park, CA (US); Wey-Jiun Lin, Los Altos Hills, CA (US); Ivan S. Maric, Cupertino, CA (US); Andreas G. Weber, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 16/262,741

(22) Filed: Jan. 30, 2019

(65) Prior Publication Data

US 2019/0369353 A1 Dec. 5, 2019

Related U.S. Application Data

(60) Provisional application No. 62/677,581, filed on May 29, 2018.

(51) Int. Cl.
*G02B 7/02* (2021.01)
*G02B 27/01* (2006.01)

(52) U.S. Cl.
CPC ........... *G02B 27/017* (2013.01); *G02B 7/021* (2013.01); *G02B 7/023* (2013.01); *G02B 27/01* (2013.01)

(58) Field of Classification Search
None
See application file for complete search history.

(56) References Cited

U.S. PATENT DOCUMENTS 8,089,553 B2 * 1/2012 Suzuki ................ G03B 17/04
348/335
2012/0127062 A1 5/2012 Bar-Zeev et al.
(Continued)

FOREIGN PATENT DOCUMENTS

CN 205608303 U 9/2016
CN 107077002 A 8/2017
(Continued)

OTHER PUBLICATIONS

U.S. Appl. No. 15/434,623, filed Feb. 16, 2017.
U.S. Appl. No. 62/551,723, filed Aug. 29, 2017.

*Primary Examiner* — Christopher Stanford
*Assistant Examiner* — Journey F Sumlar
(74) *Attorney, Agent, or Firm* — Treyz Law Group, P.C.; Kendall W. Abbasi

(57) ABSTRACT

A head-mounted display may include a display system and a lens system in a housing. The head-mounted display may include control circuitry that operates the head-mounted display in an active use mode and a protected mode. In the protected mode, the display system may be protected from collisions with the lens system. Placing the head-mounted display in the protected mode may include using an actuator to increase the distance between the display system and the lens system, may include injecting fluid between the display system and the lens system, and/or may include deploying a protective layer between the display system and the lens system. The control circuitry may determine whether to operate the head-mounted display in protected mode or active use mode based on sensor data, on/off status information, location information, and/or other information.

18 Claims, 5 Drawing Sheets

(56) References Cited

U.S. PATENT DOCUMENTS

| | | | |
|---|---|---|---|
| 2013/0050833 A1 | 2/2013 | Lewis et al. | |
| 2014/0320972 A1 | 10/2014 | Magyari et al. | |
| 2015/0002374 A1 | 1/2015 | Erinjippurath et al. | |
| 2016/0018655 A1* | 1/2016 | Imoto | G02B 27/017 345/8 |
| 2016/0140887 A1* | 5/2016 | Kim | G09G 3/3406 345/690 |
| 2017/0090208 A1 | 3/2017 | Parker et al. | |
| 2017/0148215 A1 | 5/2017 | Aksoy et al. | |
| 2017/0177090 A1* | 6/2017 | Anderson | G02B 27/017 |
| 2018/0003919 A1 | 1/2018 | Song et al. | |
| 2019/0137766 A1* | 5/2019 | Jang | G02B 27/0172 |
| 2019/0304116 A1* | 10/2019 | Price | G06T 7/593 |

FOREIGN PATENT DOCUMENTS

| | | |
|---|---|---|
| DE | 10307324 B3 | 8/2004 |
| GN | 106597669 A | 4/2017 |
| GN | 207181829 U | 4/2018 |
| WO | 2016081697 A1 | 5/2016 |

\* cited by examiner

OPTICAL SYSTEM FOR HEAD-MOUNTED DISPLAY

This application claims the benefit of provisional patent application No. 62/677,581, filed May 29, 2018, which is hereby incorporated by reference herein in its entirety.

FIELD

This relates generally to optical systems and, more particularly, to optical systems for head-mounted displays.

BACKGROUND

Head-mounted displays such as virtual reality glasses use lenses to display images for a user. A display may create images for each of a user's eyes. A lens may be placed between each of the user's eyes and a portion of the display so that the user may view virtual reality content.

If care is not taken, a head-mounted display may be vulnerable to damage. An optical system in the head-mounted display may include a lens directly adjacent to a display, which runs the risk of unwanted collisions between the lens and the display in the event that the head-mounted display is dropped or hit by an external object. Such collisions can damage the lens and the display in the head-mounted device.

It would therefore be desirable to be able to provide improved head-mounted displays.

SUMMARY

A head-mounted display may include a display system and a lens system. The display system and lens system may be supported by a housing that is worn on a user's head. The head-mounted display may use the display system and lens system to present images to the user while the housing is being worn on the user's head. The display system may include a pixel array that produces images that are viewable through the lens system.

The head-mounted display may include control circuitry that operates the head-mounted display in an active use mode and a protected mode. In the protected mode, the display system may be protected from collisions with the lens system. Placing the head-mounted display in the protected mode may include using an actuator to increase the distance between the display system and the lens system (e.g., by moving one or both of the display system and the lens system away from each other), may include injecting fluid between the display system and the lens system, and/or may include deploying a protective layer between the display system and the lens system. The control circuitry may determine whether to operate the head-mounted display in protected mode or active use mode based on sensor data, on/off status information, location information, and/or other information.

DETAILED DESCRIPTION

Head-mounted displays may be used for virtual reality and augmented reality systems. For example, a pair of virtual reality glasses that is worn on the head of a user may be used to provide a user with virtual reality content.

Figure 1:
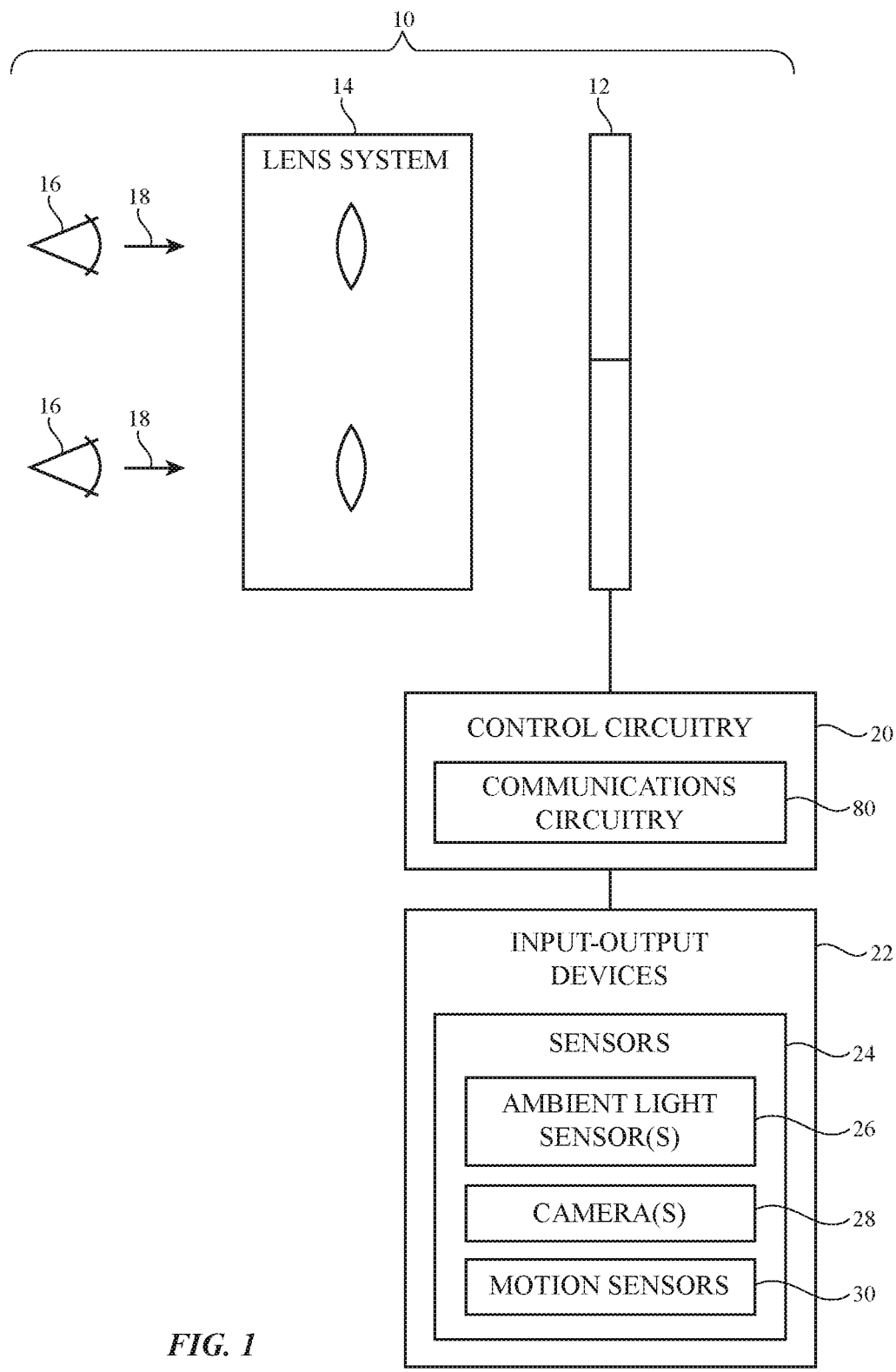
FIG. 1 is a diagram of an illustrative head-mounted display in accordance with an embodiment.

An illustrative system in which a head-mounted display such as a pair of virtual reality glasses is used in providing a user with virtual reality content is shown in FIG. 1. As shown in FIG. 1, virtual reality glasses (head-mounted display) 10 may include a display system such as display system 12 that creates images and may have an optical system such as lens system 14 through which a user (see, e.g., user's eyes 16) may view the images produced by display system 12 by looking in direction 18.

Display system 12 may be based on a liquid crystal display (e.g., liquid-crystal-on-silicon), an organic light-emitting diode display, an emissive display having an array of crystalline semiconductor light-emitting diode dies, and/or displays based on other display technologies. Separate left and right displays may be included in system 12 for the user's left and right eyes or a single display may span both eyes.

Visual content (e.g., image data for still and/or moving images) may be provided to display system (display) 12 using control circuitry 20 that is mounted in glasses (head-mounted display) 10 and/or control circuitry that is mounted outside of glasses 10 (e.g., in an associated portable electronic device, laptop computer, or other computing equipment). Control circuitry 20 may include storage such as hard-disk storage, volatile and non-volatile memory, electrically programmable storage for forming a solid-state drive, and other memory. Control circuitry 20 may also include one or more microprocessors, microcontrollers, digital signal processors, graphics processors, baseband processors, application-specific integrated circuits, and other processing circuitry. Control circuitry 20 may use display system 12 to display visual content such as virtual reality content (e.g., computer-generated content associated with a virtual world), pre-recorded video for a movie or other media, or other images. Illustrative configurations in which control circuitry 20 provides a user with virtual reality content using display system 12 may sometimes be described herein as an example. In general, however, any suitable content may be presented to a user by control circuitry 20 using display system 12 and lens system 14 of glasses 10.

Communications circuits in circuitry 20 such as communications circuitry 80 may be used to transmit and receive data (e.g., wirelessly and/or over wired paths). Communications circuitry 80 may include wireless communication circuitry such as one or more antennas and associated radio-frequency transceiver circuitry. Transceiver circuitry in communications circuitry 80 may include wireless local area network transceiver circuitry (e.g., WiFi® circuitry), Bluetooth® circuitry, cellular telephone transceiver circuitry, ultra-wideband communications transceiver circuitry, millimeter wave transceiver circuitry, near-field communications circuitry, satellite navigation system circuitry such as Global Positioning System (GPS) receiver circuitry (e.g., for receiving GPS signals at 1575 MHz or for handling other satellite positioning data), and/or wireless circuitry that transmits and/or receives signals using light (e.g., with light-emitting diodes, lasers, or other light sources and corresponding light detectors such as photodetectors). Antennas in communications circuitry 80 may include monopole antennas, dipole antennas, patch antennas, inverted-F antennas, loop antennas, slot antennas, other antennas, and/or antennas that include antenna resonating elements of more than one type (e.g., hybrid slot-inverted-F antennas, etc.).

If desired, control circuitry 20 may determine the location of glasses 10 using communications circuitry 80. For example, control circuitry 20 may determine the location of glasses 10 by processing wireless signals (e.g., ultra-wideband signals, Bluetooth® signals, WiFi® signals, millimeter wave signals, or other suitable signals) using signal strength measurement schemes, time based measurement schemes such as time of flight measurement techniques, time difference of arrival measurement techniques, angle of arrival measurement techniques, triangulation methods, time-of-flight methods, using a crowdsourced location database, and/or other suitable measurement techniques. If desired, control circuitry 20 may determine the location of glasses 10 using Global Positioning System receiver circuitry in circuitry 80 and/or using sensors 24 such as proximity sensors (e.g., infrared proximity sensors or other proximity sensors), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, using image data from a camera, using motion sensor data, and/or using other circuitry in glasses 10.

Input-output devices 22 may be coupled to control circuitry 20. Input-output devices 22 may be used to gather user input from a user, may be used to make measurements on the environment surrounding glasses 10, may be used to provide output to a user, and/or may be used to supply output to external electronic equipment. Input-output devices 22 may include buttons, joysticks, keypads, keyboard keys, touch sensors, track pads, displays, touch screen displays, microphones, speakers, light-emitting diodes for providing a user with visual output, and/or other input-output circuitry.

Input-output devices 22 may include sensors 24. Sensors 24 may include force sensors, temperature sensors, magnetic sensors, proximity sensors, capacitive touch sensors, strain gauges, gas sensors, pressure sensors, and/or other sensors. For example, sensors 24 may include a color ambient light sensor or other ambient light sensor 26 for gathering ambient light measurements (e.g., ambient light levels such as ambient light luminance measurements and/or ambient light color measurements such as color temperature measurements and/or color coordinate measurements). Ambient light sensors 26 may include inward facing ambient light sensors (e.g., facing eyes 16) and/or outward facing ambient light sensors (e.g., facing the environment in front of the user).

Sensors 24 may include one or more cameras 28 (e.g., digital image sensors) including cameras for capturing images of the user's surroundings, cameras for performing gaze detection operations by viewing eyes 16, and/or other cameras. Cameras 28 may include inward facing cameras (e.g., facing eyes 16) and/or outward facing cameras (e.g., facing the environment in front of the user).

Sensors 24 may include one or more motion sensors 30. Motion sensors 30 may include one or more accelerometers, compasses, gyroscopes, barometers, pressure sensors, magnetic sensors, inertial measurement units that contain some or all of these sensors, and/or other sensors for measuring orientation, position, and/or movement of glasses 10. Motion sensors 30 may produce sensor data that indicates whether glasses 10 are in freefall and/or whether glasses 10 are being removed from or placed on a user's head. For example, an upward motion arc or lifting from a surface may indicate glasses 10 are being placed on or have been placed on a user's head, whereas a downward motion arc or setting down onto a surface may indicate that glasses 10 are being removed or have been removed from a user's head.

Figure 2:
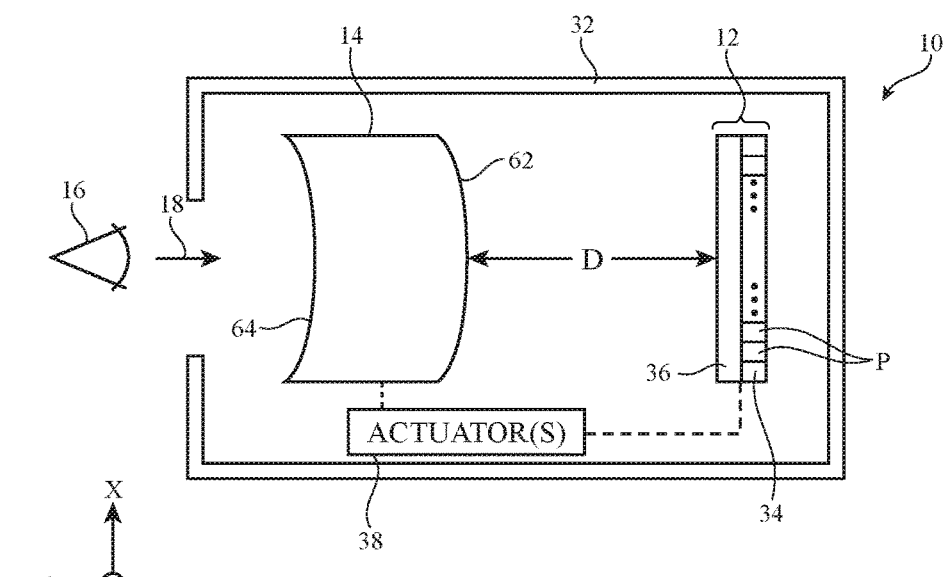
FIG. 2 is a diagram of an illustrative head-mounted display having a lens system, a display system, and an actuator for adjusting a distance between the lens system and the display system in accordance with an embodiment.

FIG. 2 is a cross-sectional side view of glasses 10 showing how lens system 14 and display system 12 may be supported by head-mounted support structures such as housing 32 for glasses 10. Housing 32 may have the shape of a frame for a pair of glasses (e.g., glasses 10 may resemble eyeglasses), may have the shape of a helmet (e.g., glasses 10 may form a helmet-mounted display), may have the shape of a pair of goggles, or may have any other suitable housing shape that allows housing 32 to be worn on the head of a user. Configurations in which housing 32 supports lens system 14 and display system 12 in front of a user's eyes (e.g., eyes 16) as the user is viewing system 14 and display system 12 in direction 18 may sometimes be described herein as an example. If desired, housing 32 may have other suitable configurations.

Housing 32 may be formed from plastic, metal, fiber-composite materials such as carbon-fiber materials, wood and other natural materials, fabric, glass, silicone, other materials, and/or combinations of two or more of these materials.

Input-output devices 22 and control circuitry 20 may be mounted in housing 32 with lens system 14 and display system 12 and/or portions of input-output devices 22 and control circuitry 20 may be coupled to glasses 10 using a cable, wireless connection, or other signal paths.

Display system 12 may include a source of images such as pixel array 34. Pixel array 34 may include a two-dimensional array of pixels P that emit image light. Pixels P may be liquid-crystal-on-silicon pixels (e.g., with a frontlight), organic light-emitting diode pixels, light-emitting diode pixels formed from semiconductor dies, liquid crystal display pixels with a backlight, etc.). Display system 12 may include additional layers such as additional layers 36. Additional layers 36 may include one or more polarizers (e.g., one or more linear polarizers, to provide polarized image light), one or more wave plates (e.g., a quarter wave plate to provide circularly polarized image light), one or more optical films, and/or other layers.

Lens system 14 may include one or more lenses. Lenses in lens system 14 may include one or more plano-convex lenses (e.g., a first plano-convex lens having a convex surface 62 facing display system 12 and a second plano-convex lens having a concave surface 64 facing eyes 16). This is, however, merely illustrative. Other lens arrangements may be used in lens system 14, if desired. Lens system 14 may include one lens, two lenses, three lenses, or more than three lenses.

Optical structures such as partially reflective coatings, wave plates, reflective polarizers, linear polarizers, antireflection coatings, and/or other optical components may be incorporated into glasses 10 (e.g., system 14, etc.). These optical structures may allow light rays from display system 12 to pass through and/or reflect from surfaces in lens system 14 to provide lens system 14 with a desired lens power.

As shown in FIG. 2, glasses 10 may include one or more actuators such as actuators 38. Actuators 38 may be linear or rotational and may include electric actuators, mechanical actuators, electromechanical actuators, pneumatic actuators, hydraulic actuators, and/or other suitable actuators. Actuators 38 may be used to adjust the distance D between lens system 14 and display system 12. Control circuitry 20 may, if desired, use actuators 38 to adjust distance D to accommodate the user's eye prescription (e.g., to accommodate different diopter ranges). For example, control circuitry 20 may adjust distance D to one value according to the prescription of a first user and may adjust distance D to another value according to the prescription of a second user. To achieve the desired distance D, actuator 38 may be configured to move lens system 14 along the Z-axis while display system 12 remains fixed, may be configured to move display system 12 along the Z-axis while lens system 14 remains fixed, and/or may be configured to move both lens system 14 and display system 12 along the Z-axis.

If desired, control circuitry 20 may also use actuators 38 to move lens system 14 and/or display system 12 along the Y-axis to accommodate different interpupillary distances associated with different viewers. Control circuitry 20 may measure the interpupillary distance of each viewer by capturing images of the viewer's eyes with camera 28 or other sensors and processing the resulting eye position data to extract information on the locations of the viewers pupils. Control circuitry 20 may match the distance between the centers of left and right lens systems 14 to the measured interpupillary distance.

If desired, actuators 38 may be configured to move display system 12 and/or lens system 14 in other ways. In general, actuators 38 may be configured to move display system 12 and/or lens system 14 in any suitable fashion (e.g., linearly along the X, Y, and/or Z axes, and/or rotationally about the X, Y, and/or Z axes).

Display system 12 and optical system 14 of glasses 10 may be configured to display images for a user's eyes 16 using a lightweight and compact arrangement. In some arrangements, display system 12 may be relatively close to lens system 14. For example, when glasses 10 are in use, the distance D between display system 12 and lens system 14 may be between 0.5 mm and 1 mm, between 0.1 mm and 0.75 mm, between 0.75 mm and 2 mm, less than 2 mm, greater than 2 mm, or other suitable distance.

This type of compact arrangement may raise the risk of impact between display system 12 and lens system 14. Glasses 10 may be dropped, or an external object may strike glasses 10. If care is not taken, these types of incidents may cause collisions between lens system 14 and display system 12, which can cause damage to one or both system.

To protect display system 12 and lens system 14, control circuitry 20 may operate glasses 10 in first and second modes such as an active use mode and a protected mode. When glasses 10 are in active use mode, glasses 10 may operate normally and control circuitry 20 may set distance D to any suitable distance (e.g., may set distance D to a minimum distance, a maximum distance, or any other suitable distance). Control circuitry 20 may, for example, set distance D to a distance that accommodates the user's eye prescription.

When glasses 10 are in protected mode, control circuitry 20 may take certain actions to protect display system 12 and lens system 14. This may include using actuators 38 to move display system 12 and/or lens system 14 along the Z-axis to increase distance D, using actuators 38 to move display system 12 and/or lens system 14 along the Y-axis to increase the lateral distance between display system 12 and/or lens system 14, using actuators 38 to rotate display system 12 away from lens system 14 or vice versa, inserting a protective layer between display system 12 and lens system 14 such as a layer of air, fluid, and/or a layer of material that helps prevent collisions between display system 12 and lens system 14.

If desired, control circuitry 20 may take other actions to place glasses 10 in protected mode. For example, control circuitry 20 may provide a protective layer on one or more outer surfaces of glasses 10 to protect glasses 10 from undesired impact. This may include expanding an outer structure (e.g., expanding a face seal or other air-filled structure), deploying a protective layer across the front of glasses 10, and/or taking other suitable actions. Arrangements in which operating glasses 10 in protected mode includes taking steps to prevent collisions between display system 12 and lens system 14 are sometimes described herein as an illustrative example.

Control circuitry 20 may determine when to operate glasses 10 in active use mode and when to operate glasses 10 in protected mode based on sensor data from sensors 24, based on on/off status information, based on location information, and/or based on other information. For example, control circuitry 20 may use sensors 24, on/off status information, and/or location information to determine when device 10 is accidentally dropped, to determine when device 10 is not in use, to determine when an incoming external object is likely to strike glasses 10, and/or to identify other scenarios in which it may be desirable to place glasses 10 in protected mode.

As examples, control circuitry 20 may place glasses 10 in protected mode when data from motion sensor 30 indicates that glasses 10 are in freefall, when data from motion sensor 30 and/or an inward-facing camera 28 indicates that glasses 10 have been removed from a user's head, when data from an outward-facing camera 28 indicates that an external object is nearing contact with glasses 10, when glasses 10 have been turned off or are otherwise not in use, when location information indicates that glasses 10 are outside, and/or when other information indicates that glasses 10 should be placed in protected mode.

Control circuitry 20 may place glasses 10 in active use mode when data from motion sensor 30 indicates that glasses 10 are being lifted off of a surface, when data from motion sensor 30 and/or an inward-facing camera 28 indicates that glasses 10 have been placed on a user's head, when data from an outward-facing camera 28 indicates that an external object is no longer nearing contact with glasses 10, when glasses 10 have been turned on or are otherwise in use, when location information indicates that glasses 10 are inside, and/or when other information indicates that glasses 10 should be placed in active use mode. These examples are merely illustrative. In general, control circuitry 20 may place glasses 10 in active use mode or protected mode in response to any suitable information.

Control circuitry 20 may control the left and right systems of glasses 10 separately (e.g., such that determining whether to operate the left or right system in active use mode or protected mode is done on a per-eye basis) or control circuitry may control the left and right systems of glasses 10 together (e.g., such that the left and right systems are always operated in the same mode).

In some arrangements, glasses 10 may be operated in an active use mode where display system 12 is already sufficiently spaced apart from lens system 14 (e.g., due to a given user's particular eye prescription). In these scenarios, it may not be necessary for control circuitry 20 to take any action to place glasses 10 in protected mode.

Figure 3:
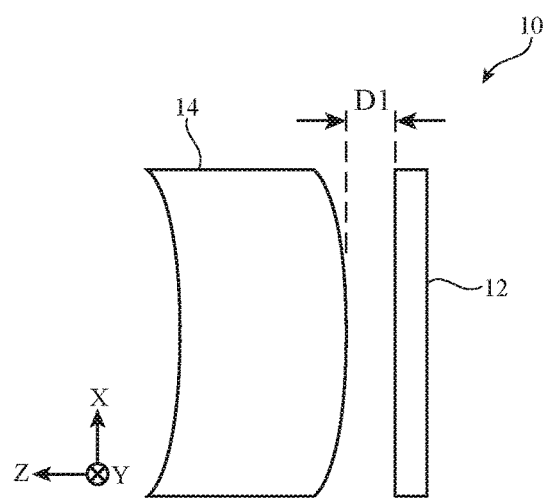
FIG. 3 is a side view of an illustrative head-mounted display in active use mode in accordance with an embodiment.
Figure 4:
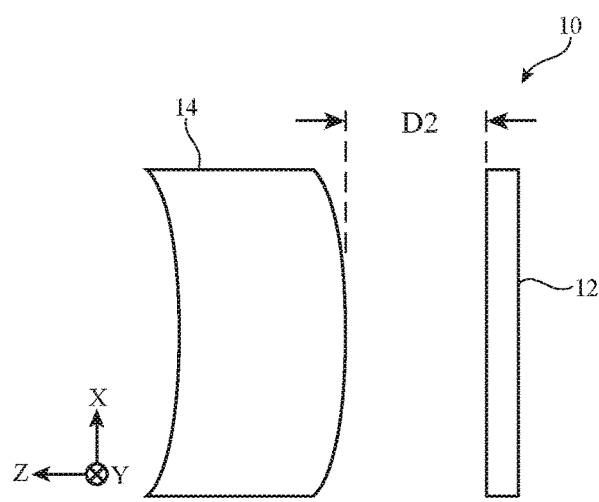
FIG. 4 is a side view of an illustrative head-mounted display in protected mode in accordance with an embodiment.

FIGS. 3 and 4 show how control circuitry 20 may place glasses 10 in active use mode or protected mode by changing the distance D between lens system 14 and display system 12. In the active use mode shown in FIG. 3, lens system 14 is spaced apart from display system 12 by distance D1. In the protected mode of FIG. 4, lens system 14 is spaced apart from display system 12 by distance D2, which is greater than D1. D1 may be any suitable distance (e.g., a distance based on the user's eye prescription or other suitable distance). D1 may, for example, be between 0.5 mm and 1 mm, between 0.1 mm and 0.75 mm, between 0.75 mm and 2 mm, less than 2 mm, greater than 2 mm, or other suitable distance. D2 may be between 5 mm and 6 mm, between 5 mm and 5.5 mm, between 4 mm and 5 mm, between 2 mm and 3 mm, greater than 3 mm, or less than 3 mm. D2 may be a maximum distance possible between lens system 14 and display system 12 or may be other suitable distance.

Control circuitry 20 may shift from the active mode configuration of FIG. 3 to the protected mode configuration of FIG. 4 using actuator 38. Actuator 38 may be configured to move lens system 14 along the Z-axis (e.g., along an optical axis associated with lens system 14) while display system 12 remains fixed, may be configured to move display system 12 along the Z-axis while lens system 14 remains fixed, and/or may be configured to move both lens system 14 and display system 12 along the Z-axis. The actuator that is used to switch between active and protected mode may be the same actuator that controls distance D of FIG. 1 for accommodating different diopter ranges (e.g., one actuator 38, sometimes referred to as a focus motor, may be used for eye prescription accommodation and switching between active and protected mode), or the actuator that is used to switch between active and protected mode may be a different actuator from the actuator that controls distance D for accommodating different diopter ranges.

Figure 5:
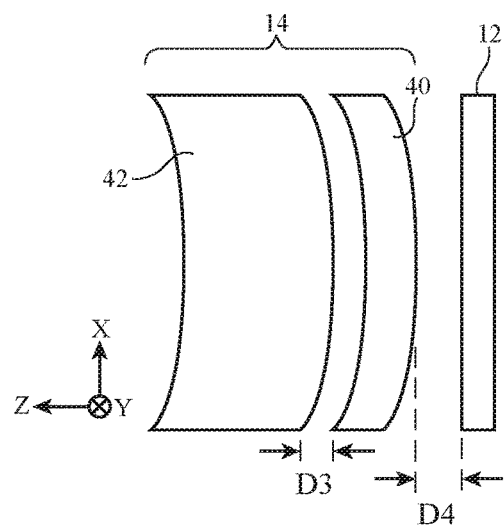
FIG. 5 is a side view of an illustrative head-mounted display having a lens system with an interposer lens in active use mode in accordance with an embodiment.
Figure 6:
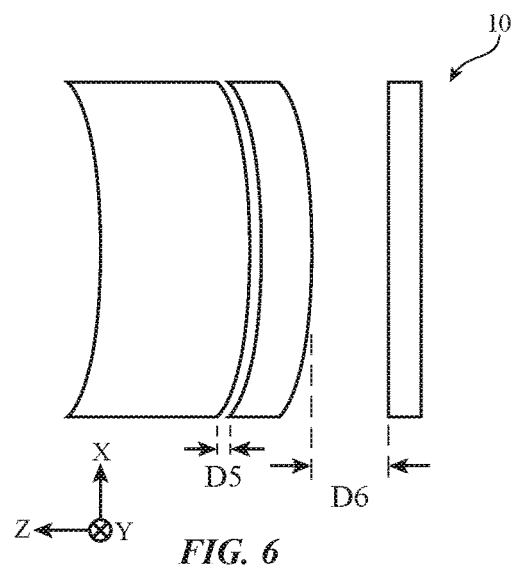
FIG. 6 is a side view of an illustrative head-mounted display having a lens system with an interposer lens in protected mode in accordance with an embodiment.

FIGS. 5 and 6 show an example in which lens system 14 includes multiple lenses and only one lens is adjusted to switch between active use mode and protected mode. As shown in FIG. 5, lens system 14 include first lens 42 and second lens 40. Second lens 40 (sometimes referred to as interposer lens 40) may be interposed between display system 12 and first lens 42. Control circuitry 20 may place glasses 10 in active use mode or protected mode by changing the position of interposer lens 40.

In the active use mode shown in FIG. 5, first lens 42 is spaced apart from interposer lens 40 by distance D3, and interposer lens 40 is spaced apart from display system 12 by distance D4. In the protected mode of FIG. 6, first lens 42 is spaced apart from interposer lens 40 by distance D5, and interposer lens 40 is spaced apart from display system 40 by distance D6.

Control circuitry 20 may shift from the active mode configuration of FIG. 5 to the protected mode configuration of FIG. 6 using actuator 38. Actuator 38 may be configured to move interposer lens 40 along the Z-axis while display system 12 and first lens 42 remain fixed, may be configured to move both lenses 40 and 42 along the Z-axis while display system 12 remains fixed, and/or may be configured to move display system 12 along the Z-axis while both lenses 40 and 42 remain fixed.

In arrangements where only interposer lens 40 is moved and display system 12 and first lens 42 are fixed, distance D6 is greater than distance D4, and distance D5 is less than distance D3. In arrangements where both lenses 42 and 40 are moved and display system 12 is fixed, distance D6 is greater than distance D4, and distance D5 is less than, greater than, or equal to distance D3. In arrangements where both lenses 40 and 42 are fixed and display system 12 is moved, distance D6 is greater than distance D4, and distance D5 is equal to distance D3.

Figure 7:
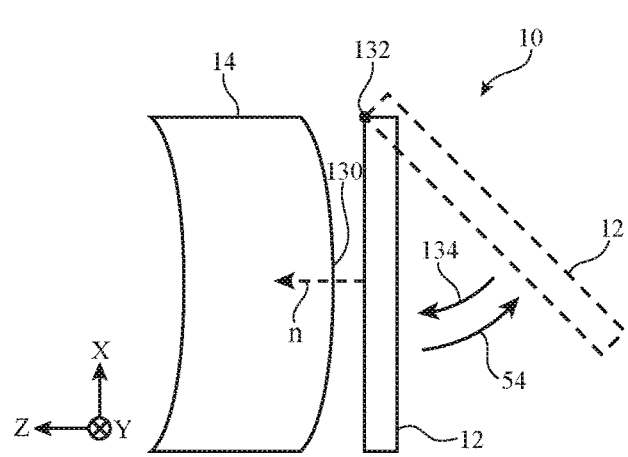
FIG. 7 is a side view of an illustrative head-mounted display having a display system that is rotated relative to a lens system to shift between active use mode and protected mode in accordance with an embodiment.

FIG. 7 shows an example in which control circuitry 20 shifts between active use mode and protected mode by rotating display system 12 relative to lens system 14. As shown in FIG. 7, control circuitry 20 use actuator 38 to shift glasses 10 from active use mode to protected mode by rotating display system 12 about rotational axis 132. This moves display system 12 in direction 54 from an active use position (where normal axis n is parallel to the Z-axis) to a protected position (indicated with dashed lines), with increased distance between display system 12 and apex 130 of lens system 14. To place glasses 10 in active use mode, control circuitry 20 may rotate display system 12 back in direction 134 about axis 132. If desired, display system 12 may rotate about a different axis. Axis 132 of FIG. 7 is merely illustrative. Arrangements where actuator 38 rotates lens system 14 instead of or in addition to rotating display system 12 may also be used.

Figure 8:
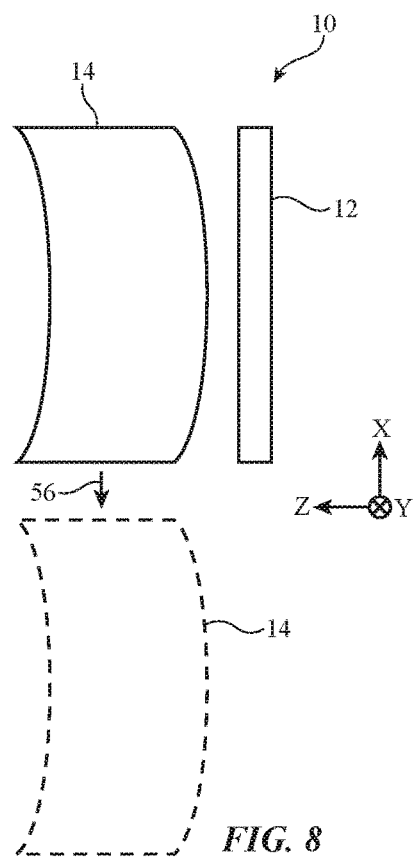
FIG. 8 is a side view of an illustrative head-mounted display having a lens system that is moved laterally relative to a display system to shift between active use mode and protected mode in accordance with an embodiment.

FIG. 8 shows an example in which control circuitry 20 shifts between active use mode and protected mode by moving lens system 14 laterally relative to display system 12. As shown in FIG. 8, control circuitry 20 use actuator 38 to shift glasses 10 from active use mode to protected mode by shifting lens system 14 in direction 56 (e.g., parallel to the X-axis) to a protected position (indicated with dashed lines).

The actuator that is used to switch between active and protected mode of FIG. 8 may be the same actuator that adjusts the lateral position of lens system 14 for accommodating different interpupillary distances of different users (e.g., one actuator 38, sometimes referred to as an interpupillary distance motor, may be used for interpupillary distance accommodation and switching between active and protected mode), or the actuator that is used to switch between active and protected mode may be a different actuator from the actuator that accommodates different interpupillary distances.

Figure 9:
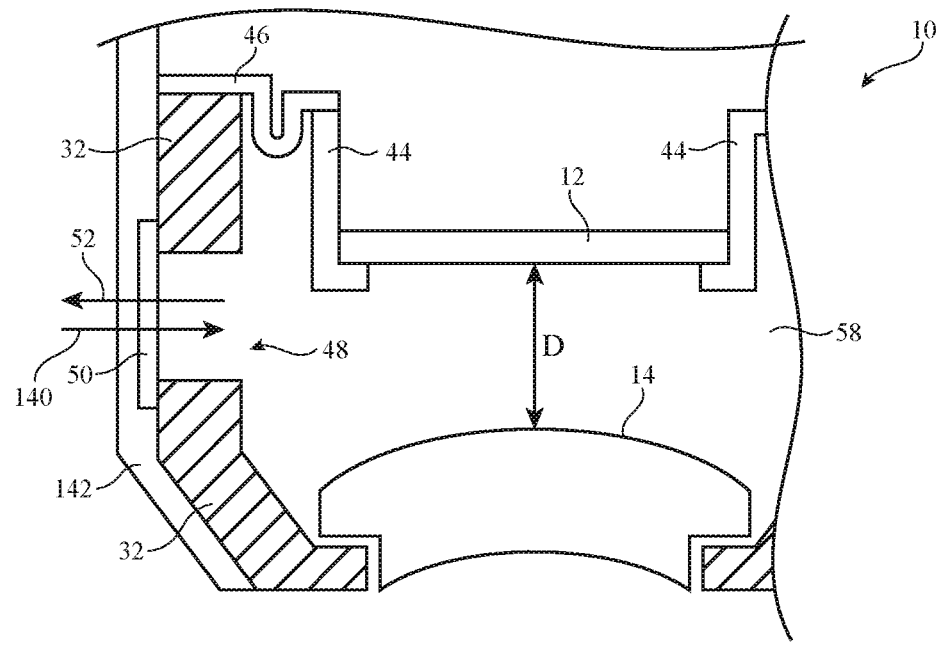
FIG. 9 is a cross-sectional view of an illustrative head-mounted display in which fluid such as air is injected between a display system and a lens system to shift between active use mode and protected mode in accordance with an embodiment.

In the example of FIG. 9, control circuitry 20 uses fluids to control a distance between display system 12 and lens system 14 to switch between active use mode and protected mode. As shown in FIG. 9, glasses 10 may include display system 12 and lens system 14 mounted in housing 32. Display system 12 may be mounted to a support frame such as support frame 44 that is coupled to a flexible seal 46. Chamber 58 may be located between display system 12 and lens system 14.

As shown in FIG. 9, glasses 10 have has a fluid reservoir such as reservoir 142. The fluid of reservoir 142 may pass through one or more openings in housing 32 such as opening 48. Opening 48 may be uncovered or may, if desired, be covered with a permeable layer such as permeable layer 50. Permeable layer 50 may be an adjustable vent that can be opened and closed (e.g., opened and closed in response to control signals from control circuitry 20), or permeable layer 50 may be a porous membrane with numerous openings.

Fluid may pass through openings such as opening 48 as indicated by arrow 140 in response to control signals from control circuitry 20. The fluid may be a gas (e.g., air, nitrogen, etc.) or may be a liquid such as a charged liquid or may be a ferrofluid (e.g., a ferromagnetic material formed from suspended ferromagnetic particles in a liquid carrier). Electrodes for controlling fluid flow may be mounted in any suitable location. When a signal is applied to the electrodes, fluid from layer 142 (e.g., electrically charged liquid in reservoir 142) may be drawn into chamber 58. Lateral barrier structures such as housing 32 may confine the liquid laterally and may cause the liquid to locally push outwards on display system 12 and/or lens system 14, causing distance D to increase so that glasses 10 are in protected mode. To shift into active mode, control circuitry 20 may draw the fluid out of chamber 58 in direction 52 and back into reservoir 142, causing distance D to decrease.

If desired, the fluid that fills chamber 58 may be air (e.g., from a fan in glasses 10) that is pushed through opening 48 into chamber 58. In this type of scenario, electrodes may not be necessary to control the flow of air through opening 48 into and out of chamber 58.

Figure 10:
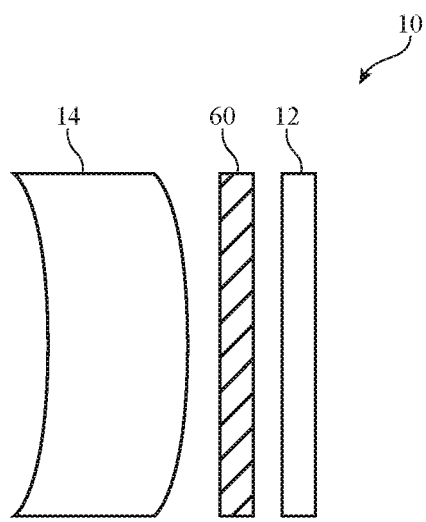
FIG. 10 is a side view of an illustrative head-mounted display having a protective layer deployed between a display system and a lens system to shift between active use mode and protected mode in accordance with an embodiment.

If desired, control circuitry 20 may deploy a protective layer when glasses 10 are operated in protected mode. This type of arrangement is illustrated in FIG. 10. As shown in FIG. 10, protective layer 60 may be interposed between display system 12 and lens system 14. Protective layer 60 may be fixed in the position shown in FIG. 10, or protective layer 60 may be moved to a different location when glasses 10 are in active use mode. Protective layer 60 may be layer of polymer, carbon fiber, metal, shape memory material, electroactive polymer, piezoelectric materials, other suitable materials, or a combination of these materials. Protective layer 60 may be actively controlled (e.g., control circuitry 20 may apply control signals to electrodes or other circuitry coupled to protective layer 60 to deploy protective layer 60), or protective layer 60 may be passive (e.g., protective layer 60 may automatically be deployed due to gravity when glasses 10 are in freefall, protective layer 60 may be a polymer that becomes stiff under strain, or other passive arrangements may be used). If desired, protective layers in glasses 10 such as protective layer 60 may be deployed in other locations when glasses 10 are in protected mode (e.g., on either side of display system 12, on either side of lens system 14, on one or more outer surfaces of glasses 10, etc.). The example of FIG. 10 is merely illustrative.

Figure 11:
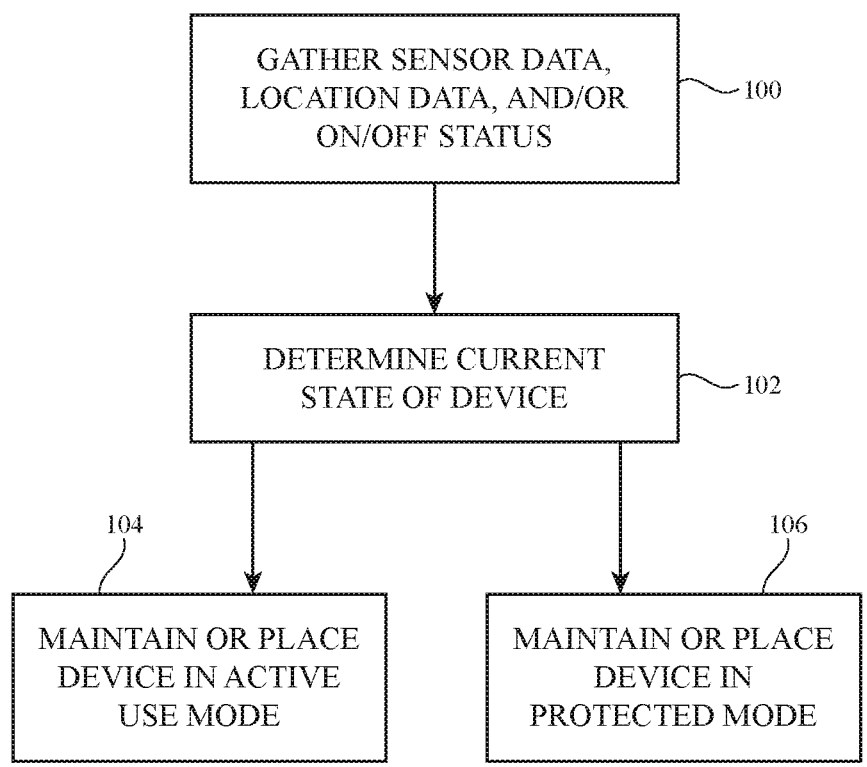
FIG. 11 is a flow chart of illustrative steps involved in operating a head-mounted display in active use mode and protected mode in accordance with an embodiment.

FIG. 11 is a flow chart of illustrative steps involved in operating glasses such as glasses 10 of the type shown in FIGS. 1-10.

At step 100, control circuitry 20 may gather sensor data from sensors 24 (e.g., ambient light information from ambient light sensor(s) 26, camera data from camera(s) 28, motion data from motion sensor(s) 30, and/or data from other sensors 24), location data from communications circuitry (e.g., location data gathered using Global Positioning System Receiver Circuitry, radio-frequency transceiver circuitry, sensors 24, or other location tracking circuitry), on/off status information (e.g., whether glasses 10 are powered on or off), and/or other information.

At step 102, control circuitry 20 may process the data gathered in step 100 to determine the current state of glasses 10. Determining the current state of glasses 10 may include determining whether glasses 10 are in use, not in use, vulnerable to an impending collision, or not vulnerable to an impending collision. Step 102 may include, for example, determining whether glasses 10 are in free fall or lifted off of a surface using data from motion sensor 30, whether glasses 10 have been removed from or placed on a user's head using data from motion sensor 30 and/or inward-facing camera 28, whether an external object is nearing contact with or moving away from glasses 10 using outward-facing camera 28, whether glasses 10 have been turned on or off, whether device 10 is inside or outside, and/or determining other information about the status of glasses 10 based on the information gathered in step 100.

If it is determined in step 102 that glasses 10 are in use and/or that no impending collision is likely, processing may proceed to step 104.

At step 104, control circuitry 20 may maintain or place glasses 10 in active use mode. If glasses 10 are already in active use mode, no action may be necessary. If glasses 10 are in protected mode, control circuitry 20 may shift glasses 10 from protected mode to active use mode by reducing the distance between display system 12 and lens 14 (e.g., using one or more of the arrangements shown in FIGS. 3, 5, 7, 8, and 9), by retracting or otherwise modifying a protective layer (e.g., protective layer 60 of FIG. 100), and/or by taking other actions to place glasses 10 in a normal use mode. In active use mode, control circuitry 20 may use actuator 38 to adjust the distance between display system 12 and lens 14 based on the user's eye prescription, if desired.

If it is determined in step 102 that glasses 10 are not in use and/or that an impending collision is likely, processing may proceed to step 106.

At step 106, control circuitry 20 may maintain or place glasses 10 in protected mode. If glasses 10 are already in protected mode, no action may be necessary. If glasses 10 are in active use mode, control circuitry 20 may shift glasses 10 from active use mode to protected mode by increasing the distance between display system 12 and lens 14 (e.g., using one or more of the arrangements shown in FIGS. 4, 6, 7, 8, and 9), by deploying or otherwise modifying a protective layer (e.g., protective layer 60 of FIG. 10), and/or by taking other actions to place glasses 10 in protected mode.

The foregoing is merely illustrative and various modifications can be made to the described embodiments. The foregoing embodiments may be implemented individually or in any combination.

What is claimed is:

1. A head-mounted display configured to display images viewable by a user, comprising:
   a display system including an array of pixels configured to produce the images;
   a lens system through which the images are viewable, wherein the display system and the lens system are separated by a distance;

a sensor that produces sensor data, wherein the sensor comprises a motion sensor; and control circuitry that adjusts the distance based on the sensor data to protect the display system, wherein the control circuitry increases the distance when the sensor data from the motion sensor indicates that the head-mounted display is in freefall.

2. The head-mounted display defined in claim 1 wherein the control circuitry decreases the distance when the sensor data from the motion sensor indicates that the head-mounted display has been placed on the user's head.

3. The head-mounted display defined in claim 1 wherein the control circuitry increases the distance when the sensor data from the motion sensor indicates that the head-mounted display has been removed from the user's head.

4. The head-mounted display defined in claim 1 wherein the sensor comprises a camera.

5. The head-mounted display defined in claim 4 wherein the control circuitry increases the distance when the sensor data from the camera indicates that the head-mounted display has been removed from the user's head.

6. The head-mounted display defined in claim 4 wherein the control circuitry decreases the distance when the sensor data from the camera indicates that the head-mounted display has been placed on the user's head.

7. The head-mounted display defined in claim 4 wherein the control circuitry increases the distance when the sensor data from the camera indicates that an external object is approaching the head-mounted display.

8. The head-mounted display defined in claim 1 further comprising an actuator, wherein the control circuitry uses the actuator to adjust the distance between the display system and the lens system.

9. The head-mounted display defined in claim 8 wherein the actuator moves the display system while the lens system remains fixed.

10. The head-mounted display defined in claim 8 wherein the actuator moves the lens system while the display system remains fixed.

11. The head-mounted display defined in claim 8 wherein the lens system comprises at least first and second lenses, wherein the second lens is interposed between the first lens and the display system, and wherein the actuator moves the second lens while the first lens and the display system remain fixed.

12. The head-mounted display defined in claim 1 further comprising a housing having an opening through which fluid passes to adjust the distance between the display system and the lens system.

13. A head-mounted display configured to display images viewable by a user and configured to be powered on and off, comprising:

a display system including an array of pixels configured to produce the images;

a lens system through which the images are viewable, wherein the lens system and the display system are separated by a distance;

an actuator; and control circuitry that uses the actuator to increase the distance when the head-mounted display is powered off and decrease the distance when the head-mounted display is powered on, and wherein the display system and the lens system overlap each other when the head-mounted display is powered off and when the head-mounted display is powered on.

14. The head-mounted display defined in claim 13 wherein the lens system has an optical axis and wherein the control circuitry uses the actuator to move at least one of the display system and the lens system along the optical axis.

15. The head-mounted display defined in claim 13 wherein the lens system has an apex and wherein the control circuitry uses the actuator to rotate the display system away from the apex to increase the distance.

16. A head-mounted display configured to display images viewable by a user, wherein the head-mounted display is operable in an active use mode and a protected mode, comprising:

a display system including an array of pixels configured to produce the images;

a lens system through which the images are viewable;

an accelerometer that produces motion data; and control circuitry that determines whether to operate the head-mounted display in the active use mode or the protected mode based on the motion data, wherein the display system is protected from collisions with the lens system when the head-mounted display is in the protected mode.

17. The head-mounted display defined in claim 16 further comprising a protective layer, wherein the control circuitry deploys the protective layer between the display system and the lens system when the head-mounted display is in the protected mode.

18. The head-mounted display defined in claim 16 further comprising an actuator, wherein the control circuitry uses the actuator to increase a distance between the display system and the lens system when the head-mounted display is in the protected mode.

* * * * *